United States Patent [19]

Van Broekhoven et al.

[11] Patent Number: 4,880,903
[45] Date of Patent: Nov. 14, 1989

[54] POLYKETONE FROM CARBON MONOXIDE AND MIXTURE OF OLEFINS

[75] Inventors: Johannes A. M. Van Broekhoven; Eit Drent; Ebel Klei, all of Amsterdam, Netherlands; Kenzie Nozaki, El Cerrito, Calif.

[73] Assignee: Shell Oil Company, Houston, Tex.

[21] Appl. No.: 228,429

[22] Filed: Aug. 5, 1988

Related U.S. Application Data

[60] Division of Ser. No. 190,607, May 5, 1988, which is a continuation of Ser. No. 901,917, Aug. 28, 1986, abandoned.

[30] Foreign Application Priority Data

Aug. 29, 1985 [NL] Netherlands .................. 8502372

[51] Int. Cl.$^4$ .............................................. C08G 67/02
[52] U.S. Cl. .................................................... 528/392
[58] Field of Search ........................................ 528/392

[56] References Cited

U.S. PATENT DOCUMENTS

| | | | |
|---|---|---|---|
| 2,495,286 | 6/1949 | Brubaker | 260/63 |
| 3,448,140 | 6/1969 | Gamlen | 260/471 |
| 3,689,460 | 9/1972 | Nozaki et al. | 260/63 CQ |
| 3,694,412 | 9/1972 | Nozaki | 260/63 CQ |
| 3,780,140 | 12/1973 | Hammer | 260/884 |
| 3,835,123 | 9/1974 | Nozaki | 260/94.9 B |
| 3,914,391 | 10/1975 | Nozaki | 423/364 |
| 3,948,873 | 4/1976 | Hudgin | 528/392 |
| 3,984,388 | 10/1976 | Shryne | 260/63 CQ |
| 4,024,326 | 5/1977 | Hudgin | 526/11.1 |
| 4,070,532 | 1/1978 | Hammer | 526/11.2 |
| 4,076,911 | 2/1978 | Fenton | 526/11.1 |
| 4,424,317 | 1/1984 | Serres | 525/539 |
| 4,473,482 | 9/1984 | Serres | 252/52 R |
| 4,474,978 | 10/1984 | Drent | 560/24 |
| 4,543,440 | 9/1985 | Loomis | 525/539 |
| 4,599,476 | 7/1986 | Drent | 585/511 |
| 4,634,793 | 1/1987 | Drent | 560/243 |

FOREIGN PATENT DOCUMENTS

| | | |
|---|---|---|
| 0121965 | 3/1984 | European Pat. Off. . |
| 121965 | 10/1984 | European Pat. Off. . |
| 0181014 | 5/1986 | European Pat. Off. . |
| 181014 | 5/1986 | European Pat. Off. . |
| 2046968 | 10/1964 | Japan . |
| 4048406 | 3/1969 | Japan . |
| 603481 | 6/1946 | United Kingdom . |
| 1081304 | 8/1967 | United Kingdom . |
| 2058074 | 4/1981 | United Kingdom . |

OTHER PUBLICATIONS

Tetrahedron Lett., 1971, 26, 2409–12.
J. Mol. Catal., 1983, 18, 117–25.
Chim. Ind., 1971, 53, 939–40.
J. Organomet. Chem., 1985, 279, C5–C10.
Chemtech, 1986, 1, 48–51.
Adv. Polym. Sci., 1986, 73–4, 125–44.
Polym. Lett., 1965, 3, 703–7.
J. Am. Chem. Soc., 1982, 104, 3520–2.
Organometallics, 1984, 3, 866–70.
Proc. Ind. Assoc. Cult. Sci., 1985, 86B, 1–5.

*Primary Examiner*—Harold D. Anderson
*Attorney, Agent, or Firm*—Dean F. Vance

[57] ABSTRACT

The invention is a linear random terpolymer comprised of repeating units of —CO—(C$_2$H$_4$)— and units of —CO—(C$_x$H$_y$)— where x is greater than 2 and less than 20, having a melting point between about 150° C. and about 245° C. The invention also concerns a process to prepare a polymer having a melting point less than about 245° C. which comprises contacting carbon monoxide and ethylene in the presence of one or more hydrocarbons C$_x$H$_y$ containing an olefinically unsaturated —CH═CH— group, where x is greater than 2 and less than 20, with a suitable catalyst and under conditions effective to prepare a linear random polymer having units of the formula —CO—(C$_2$H$_4$)— and units of the general formula —CO—(C$_x$H$_y$)—, and having a melting point less than about 245° C.

14 Claims, No Drawings

POLYKETONE FROM CARBON MONOXIDE AND MIXTURE OF OLEFINS

This is a division of application Ser. No. 190,607, filed May 5, 1988, which is a continuation of Ser. No. 901,917, filed Aug. 28, 1986, now abandoned.

FIELD OF THE INVENTION

The invention relates to new terpolymers of carbon monoxide with ethylene and with one or more other olefinically unsaturated hydrocarbons, and to a process for their preparation.

BACKGROUND OF THE INVENTION

Copolymers of carbon monoxide and olefins, such as ethylene, have been known and available in limited quantities for many years. They are usually prepared by reacting the CO and ethylene monomers in the presence of a catalyst. High molecular weight polymers of ethylene which contain small quantities of carbon monoxide can be prepared with the aid of Ziegler catalysts. Low molecular weight polymers of carbon monoxide with ethylene and possibly other olefinically unsaturated hydrocarbons in which all monomer units occur distributed at random within the polymer can be prepared with the aid of radical catalysts such as peroxides. A special class of the copolymers of carbon monoxide with ethylene is formed of the high molecular weight linear copolymers in which the monomer units occur in alternating order in units with the formula $—CO—(C_2H_4)—$. Such polymers can be prepared with the aid of, among others, phosphorus-, arsenic-, antimony-, or cyanogen-containing compounds of palladium, cobalt or nickel as catalysts.

The high molecular weight linear alternating polymers of carbon monoxide with ethylene have excellent mechanical properties, in particular very high strength, rigidity and impact-resistance. Due primarily to the high melting point of these polymers, about 257° C., there exist considerable problems in their processing. The processing of these polymers, for example, injection-molding, should take place in a molten state, the material being at a temperature of at least 25° C. above its melting point, i.e. at a temperature of above 280° C. It has been found that these polymers cannot withstand such high temperatures. Serious discoloration and decomposition of the polymers takes place. The high degree of gelling greatly hinders the processing of the polymers.

Attempts have been made in the past to lower the melting point of the polymers through chemical reactions to enable them to be processed at a lower temperature. Examples of such chemical reactions are those in which part of the carbonyl groups present in the polymers are converted into furan-, pyrrol-, thio- or thioketal groups. Although the above-mentioned methods can in a number of cases achieve a considerable reduction of the melting point of the polymers and thus lower the required processing temperature correspondingly, the thermal stability of the polymers is often reduced as a result of the chemical modification to such an extent that the previously mentioned problems such as discloration, decomposition and gelling occur to practically the same extent, except now at a lower processing temperature.

It should be noted from the above discussion that no solution has yet been found for the problems outlined in processing the polyketones and that there is still an urgent need for a method of lowering the melting point of the polyketone polymers which does not at the same time greatly reduce their thermal stability.

Surprisingly, it has now been found that it is possible to reduce the melting point of the polymers to a value of between 150° and 245° C. without serious detriment to the thermal stability of the polymers by including in the monomer mixture from which the polymers are prepared, in addition to carbon monoxide and ethylene, a relatively small quantity of one or more other polymerizable hydrocarbons. Polymerizable hydrocarbons suitable for this purpose have the general formula $C_xH_y$ in which x is smaller than 20 and contain an olefinically unsaturated $—CH=CH—$ group. If a catalyst is employed, such as the previously mentioned palladium, nickel and cobalt compounds enabling a high molecular weight linear alternating polymer to be prepared from a mixture of carbon monoxide and ethylene, the copolymer will consist of units with the formula $—CO—(C_2H_4)—$. If the same catalyst is employed and the compound with the general formula $C_xH_y$ is included in the co-/ethylene monomer mixture, a terpolymer will be formed containing units with the formula $—CO—(C_2H_4)—$ and different units with the general formula $—CO—(C_xH_y)—$ distributed randomly within the polymer. The structure of the two polymers differs only in that in the second case a $—(C_xH_y)—$ group is encountered instead of a $—(C_2H_4)—$ group at some random points in the polymer. The surprising result of this structural change is that the melting point is reduced without serious detriment to the thermal stability.

The extent of the melting point reduction depends, among other things, on the value of the quotient m/n, where m represents the mean number of units with the general formula $—CO—(C_xH_y)—$ and n represents the mean number of units with the formula $—CO—(C_2H_4)—$ in the polymer. For polymers of carbon monoxide with ethylene and with a given monomer with the general formula $C_xH_y$, this dependence means that if n changes, m must change proportionally in order to achieve the same melting point reduction, and that if n is constant, a larger or smaller melting point reduction will be observed as m increases or decreases. In addition, it has been found that the extent of the melting point reduction also depends on the molecular weight of the monomers with the general formula $C_xH_y$. Finally, the extent of the melting point reduction also depends on the structure of the monomers with the general formula $C_xH_y$ used in the preparation of the terpolymers.

SUMMARY OF THE INVENTION

The present invention is a polymer of CO, ethylene, and one or more hydrocarbons, which hydrocarbons have the general formula $C_xH_y$ where x is greater than 2 and less than 20, y is 2x, and which hydrocarbons contain an olefinically unsaturated $—CH=CH—$ group, and which polymer comprises:
(a) a linear structure,
(b) units of the formula $—CO—(C_2H_4)—$ and units of the general formula $—CO—(C_xH_y)—$ where x is greater than 2 and less than 20,
(c) random distribution of said units in the polymer, and
(d) a melting point between about 150° C. and about 245° C. The invention includes shaped objects consisting at least partly of these polymers.

The invention also concerns a process for preparing a polyketone having a melting point less than 245° C. which comprises contacting carbon monoxide and ethylene in the presence of one or more olefinic hydrocarbons of the general formula $C_xH_y$ where x is greater than 2 and less than 20 and containing an olefinically unsaturated —CH=CH— group, with a suitable catalyst and under conditions effective to prepare a linear random polymer having units of the formula —CO—$(C_2H_4)$— and units of the general formula —CO—$(C_xH_y)$—, and a melting point less than about 245° C. and recovering a polymer having a melting point less than about 245° C.

The invention further relates to a process to prepare a linear random polymer having units of the formula —CO—$(C_2H_4)$— and units of the general formula —CO—$(C_xH_y)$—, having a melting point less than about 245° C., which process comprises contacting carbon monoxide and ethylene in the presence of one or more olefinic hydrocarbons of the general formula $C_xH_y$ where x is greater than 2 and less than 20 and containing an olefinically unsaturated —CH=CH— group, with a catalyst wherein the catalyst is a complex compound that is obtained by reacting (1) a Group VIII metal compound, (2) a bidentate ligand of the general formula

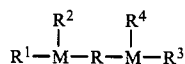

in which M is a Group Va element selected from the group consisting of phosphorus, arsenic, and antimony, $R^1$, $R^2$, $R^3$, and $R^4$ are identical or different hydrocarbon groups, R represents a divalent organic bridging group having at least two carbon atoms in the bridge, wherein the carbon atoms of the bridging group R do not contain substituents that would sterically hinder formation of the complex compound, and (3) an anion of an acid with a pKa of less than 2, provided said acid is not a hydrohalogenic acid, performing said process under conditions suitable for preparing a linear random polymer having units of the formula —CO—$(C_2H_4)$— and units of the general formula —CO—$(C_xH_y)$—, having a melting point less than 245° C., and recovering a linear random polymer having units of the formula —CO—$(C_2H_4)$— and units of the general formula —CO—$(C_xH_y)$—, and having a melting point less than about 245° C.

DETAILED DESCRIPTION OF THE INVENTION

The terpolymers according to the invention have a melting point of between 150° and 245° C. Preferred terpolymers have a melting point of between 170° and 240° C. and in particular between 195° and 235° C. As pointed out above, the extent of the melting point reduction depends on, among other things, the value of the quotient m/n. For example, for terpolymers according to the invention prepared by polymerization of carbon monoxide with ethylene and with propylene and which consist of an average of n units with the formula —CO—$(C_2H_4)$— and an average of m units with the formula —CO—$(C_3H_6)$—, a melting point of 245° C. corresponds to an m/n quotient of about 0.023, whereas a melting point of 150° C. corresponds to an m/n quotient of about 0.33. As also pointed out above, the extent of the melting point reduction also depends on the molecular weight of the monomers with the general formula $C_xH_y$ used in the preparation of the terpolymers. For example, for a terpolymer according to the invention that is prepared by polymerization of carbon monoxide with ethylene and with butylene-1 and that consists of an average of n units with the formula —CO—$(C_2H_4)$— and an average of m units with the formula —CO—$(C_4H_8)$—, a melting point of 244° C. corresponds to an m/n quotient of about 0.007, while for a terpolymer of carbon monoxide with ethylene and with propylene a melting point of 244° C. corresponds to an m/n quotient of about 0.026. Furthermore, for a terpolymer according to the invention that is prepared by polymerization of carbon monoxide with ethylene and with octylene-1 and that consists of an average of n units with the formula —CO—$(C_2H_4)$— and an average of m units with the formula —CO—$(C_8H_{16})$—, a melting point of 225° C. corresponds to an m/n quotient of about 0.057, whereas for a terpolymer of carbon monoxide with ethylene and with propylene a melting point of 225° C. corresponds to an m/n quotient of about 0.068.

The higher the molecular weight of the terpolymers according to the invention, the higher will be in general the intrinsic viscosity they exhibit. For the determination of the intrinsic viscosity of a terpolymer according to the invention, four solutions are first of all prepared by dissolving the polymer in four different concentrations at 100° C. in m-cresol. For each of these solutions, the viscosity is measured in a viscometer at 100° C. relative to m-cresol at 100° C. If $T_o$ represents the outflow time of m-cresol and $T_p$ the outflow time of the terpolymer solution, the relative viscosity ($\eta_{rel}$) is obtained from $\eta_{rel} = T_o/T_p$. From $\eta_{rel}$ can be calculated the inherent viscosity ($\eta_{inh}$) according to the formula: $\eta_{inh}$ (ln $\eta_{rel}$)/c where c represents the concentration of the terpolymer in grams per 100 ml solution. By plotting graphically the $\eta_{inh}$ found for each of the four terpolymer solutions against the corresponding concentration (c) and then by extrapolating to c=0, the intrinsic viscosity ($\eta$) in dl/g is found. Instead of "intrinsic viscosity", this patent application will henceforth use the term recommended by the International Union of Pure and Applied Chemistry, vis. "Limiting Viscosity Number" (LVN). The terpolymers according to the invention generally have an LVN of between 0.2 and 5.0 dl/g. Preferred terpolymers have an LVN of between 0.3 and 4.5 dl/g and in particular an LVN of between 0.4 and 4.0 dl/g.

As mentioned before, the terpolymers according to the invention consist of units with the formula —CO—$(C_2H_4)$— and units with the general formula —CO—$(C_xH_y)$— where x is smaller than 20. The units with the general formula —CO—$(C_xH_y)$— which are present in the polymers according to the invention can be the same or different from one another. The latter will apply if, for example, the polymers are prepared from a monomer mixture in which, besides carbon monoxide and ethylene, two or more other olefinically unsaturated hydrocarbons are present. For example, from a monomer mixture containing, in addition to carbon monoxide and ethylene, both propylene and butylene, polymers are obtained which contain units with the formula —CO—$(C_3H_6)$— as well as units with the formula —CO—$(C_4H_8)$—. But even if the mixture to be polymerized contains only one other olefinically unsaturated hydrocarbon, different units with the general formula —CO—$(C_xH_y)$— may be present in the prepared polymer. In this case, the numbers of carbon and hydrogen atoms in the various units will be the same, but they will differ in structure. For example, when using propylene, units with the formula —CO—CH(CH$_3$)—CH$_2$— and units with the formula —CO—CH$_2$—CH(CH$_3$)— may both be present. When using olefins with more carbon atoms than propylene, such as butylene, pentylene or octylene, there will, in addition to the structural differences as described for propylene, also be structural differences as a result of isomerization. For example, when using pentene-1, units with the following formulae can occur in the prepared polymer.

—CO—CH(C$_3$H$_7$)—CH$_2$—

—CO—CH$_2$—CH(C$_3$H$_7$)—

—CO—CH(CH$_3$)—CH(C$_2$H$_5$)—

—CO—CH(C$_2$H$_5$)—CH(CH$_3$)—

Preferred terpolymers are those in which all units with the general formula —CO—(C$_x$H$_y$)— have the same x and y. Such terpolymers can be prepared from a monomer mixture that in addition to carbon monoxide and ethylene only contains one other unsaturated hydrocarbon. Terpolymers are also preferred in which x is smaller than 10 and more in particular in which x is equal to 3.

The olefinically unsaturated hydrocarbons with the general formula C$_x$H$_y$ employed in the preparation of the terpolymers according to the invention can also be represented by the general formula CHR$_1$=CHR$_2$ where the groups R$_1$ and R$_2$ together contain fewer than 18 carbon atoms and where one of the groups R$_1$ and R$_2$ is a hydrocarbon group and the other one is hydrogen or also a hydrocarbon group. In the latter case, R$_1$ and R$_2$ can together form part of a cyclic structure, such as in the monomers cyclopentylene and cyclohexylene. If the groups R$_1$ and R$_2$ are hydrocarbon groups, alkyl groups are preferred. Particularly preferred are monomers in which one of the groups R$_1$ and R$_2$ is hydrogen and the other is an alkyl group and more in particular a methyl group.

As mentioned above, the terpolymers according to the invention can be prepared with the aid of a catalyst enabling a linear alternating copolymer to be prepared from a mixture of carbon monoxide and ethylene, the copolymer consisting of units with the formula —CO—(C$_2$H$_4$)—. Suitable catalysts for this purpose are the previously mentioned palladium, nickel and cobalt compounds. Examples of catalysts belonging to this group are alkyl- and arylphosphine complexes of palladium, such as bis(tributylphosphine)PdCl$_2$, bis(triphenylphosphine)PdCl$_2$, allyl(triphenylphosphine)PdCl and tetrakis(triphenylphosphine)Pd, HPd(CN)$_3$, Ni(CN)$_2$ and complex nickel salts containing a tetracyanonickel anion, such as bis(tetrabutylammonium)tetracyanonickel.

For the preparation of the terpolymers according to this invention, there is strong preference for the use of catalysts belonging to a class which will be described below. These catalysts, which have a much higher activity than those mentioned above, are obtained by the reaction of a Group VIII metal compound such as a palladium, cobalt or nickel compound, with an anion of an acid having a pKa of less than 2, other than a hydrohalogenic acid and with a bidentate ligand having the general formula R$^1$R$^2$—M—R—M—R$^3$R$^4$, where M represents phosphorus, arsenic or antimony, R$^1$, R$^2$, R$^3$ and R$^4$ represent hydrocarbon groups and R represents a bivalent organic bridge group containing at least two carbon atoms in the bridge. For the sake of brevity, these catalysts will be referred to in the rest of this patent application as "BDL" (bidentate ligand) catalysts.

For the preparation of the terpolymers according to the invention, use is preferably made of a BDL catalyst obtained from a palladium compound as Group VIII metal compound. Very suitable for this purpose are palladium salts of carboxylic acids and in particular palladium acetate. Examples of suitable acids with a pKa of less than 2 (measured in aqueous solution at 18° C.) are sulfonic acids such as methanesulfonic acid, trifluoromethanesulfonic acid and para-toluenesulfonic acid and carboxylic acids such as trichloroacetic acid, difluoroacetic acid and trifluoroacetic acid. Para-toluenesulfonic acid and trifluoroacetic acid are preferred. For the preparation of the BDL catalysts, the anion of the acid with a pKa of less than 2 is preferably present in the mixture in an amount of 0.5 to 200 and more particular of 1.0 to 100 equivalents per g—at Group VIII metal. M in the bidentate ligand is preferably phosphorus. The hydrocarbon groups R$^1$, R$^2$, R$^3$ and R$^4$ preferably contain 6 to 14 carbon atoms. Particularly preferred are bidentate ligands in which the hydrocarbon groups R$^1$, R$^2$, R$^3$ and R$^4$ are phenyl groups or alkyl-substituted phenyl groups. The bivalent organic bridge group R preferably contains three carbon atoms in the bridge. Examples of suitable bidentate ligands are: 1,3-bis(di-p-tolylphosphine)propane, 1,3-bis(diphenylphosphine)propane, and 2-methyl,2-(methyldiphenylphosphine)-1,3-bis(diphenylphosphine)propane. Preferably, one of the two last-mentioned bidentate ligands is employed. In the mixture from which the BDL catalysts are prepared the bidentate ligand is preferably present in an amount of 0.1-2 and in particular 0.9-1.1 moles per mol. Group VIII metal compound.

The polymerization is preferably carried out in a liquid diluting agent. Lower alcohols such as methanol and ethanol are very suitable as liquid diluting agents. The quantity of BDL catalyst employed for the preparation of the polymers according to the invention can vary within wide limits. Preferably, $10^{-7}$–$10^{-3}$ and more in particular $10^{-6}$–$10^{-4}$ mol. of the BDL catalyst per mol. of the olefinically unsaturated hydrocarbon to be polymerized is employed. The molar ratio of the olefinically unsaturated hydrocarbons relative to carbon monoxide in the mixture to be polymerized is preferably 10:1-1:5 and in particular 5:1-1:2. In the monomer mixture from which the terpolymers according to the invention are prepared the ratio between ethylene and the olefinically unsaturated hydrocarbons with the general formula C$_x$H$_y$ should be chosen such that a terpolymer is obtained with the desired low melting point. The carbon monoxide used in the preparation of the polymers according to the invention does not need to be pure, but may contain impurities such as hydrogen, carbon dioxide and nitrogen. The terpolymers according to the invention are preferably prepared from a monomer mixture that in addition to carbon monoxide and ethylene also contains an olefin with less than 10 carbon atoms and in particular propylene.

The preparation of the terpolymers with the aid of a BDL catalyst is preferably performed at a temperature of 20°–150° C. and a pressure of 1–200 bar and in particular at a temperature of 30°–100° C. and a pressure of 20–100 bar.

As mentioned above, the terpolymers according to the invention have excellent mechanical properties, in particular a very high strength, rigidity and impact-resistance. They can be processed by means of the usual techniques into, among other things, films, sheets, plates, fibers and molded objects. On account of their superior properties, the polymers according to the invention are suitable for many applications, such as in the automobile industry, for the manufacture of packaging material for foods and drinks, as constructional and building material, for the manufacture of cables and for a variety of applications in the domestic sphere. In order to modify their characteristics or to strengthen them, the polymers according to the invention can be employed in combination with many other sorts of materials.

The invention will now be illustrated with the aid of the following examples.

EXAMPLE 1

A carbon monoxide/ethylene copolymer was prepared as follows. 200 ml methanol was introduced into a mechanically stirred autoclave with a volume of 300 ml. After the contents of the autoclave had been brought to a temperature of 85° C., a 1:1 carbon monoxide/ethylene mixture was introduced into the autoclave until a pressure of 55 bar was reached. A catalyst solution was then introduced into the autoclave, consisting of:
6 ml methanol
0.01 mmol palladium acetate
0.01 mmol 1,3-bis(diphenylphosphine)propane, and
0.02 mmol trifluoroacetic acid.
The pressure was maintained at 55 bar by introducing under pressure a 1:1 carbon monoxide/ethylene mixture. After 5 hours the polymerization was stopped by releasing the pressure. The polymer was filtered off, washed with methanol and dried at 70° C. 30 g copolymer with a melting point of 257° C. and an LVN of 0.85 dl/g was obtained.

EXAMPLE 2

A carbon monoxide/ethylene copolymer was prepared substantially in the same way as the copolymer in Example 1, except for the following differences:
(a) instead of 1,3-bis(diphenylphospine)propane, 2-methyl,2-(methyldiphenylphosphine)-1,3-bis(diphenylphosphine)propane was used, and
(b) instead of trifluoroacetic acid, p-toluenesulfonic acid was used. 25 g copolymer with a melting point of 257° C. and an LVN of 0.58 dl/g was obtained.

EXAMPLE 3

A carbon monoxide/ethylene copolymer was prepared substantially in the same way as the copolymer in Example 2, except that in this case instead of a temperature of 85° C., a temperature of 40° C. was employed. 3 g copolymer with a melting point of 257° C. and an LVN of 3.3 dl/g was obtained.

EXAMPLE 4

A carbon monoxide/ethylene/propylene terpolymer was prepared as follows. 200 ml methanol and 5 ml liquid propylene was introduced into a mechanically stirred autoclave with a volume of 300 ml. After the contents of the autoclave had been brought to a temperature of 85° C., a 1:1 carbon monoxide/ethylene mixture was introduced into the autoclave until a pressure of 55 bar was reached. A catalyst solution was then introduced into the autoclave, consisting of:
6 ml methanol
0.01 mmol palladium acetate
0.01 mmol of 1,3-bis(diphenylphosphine)propane, and
0.2 mmol trifluoroacetic acid.
The pressure was maintained at 55 bar by introducing under pressure a 1:1 carbon monoxide/ethylene mixture. After 7 hours the polymerization was stopped by releasing the pressure. The polymer was filtered off, washed with methanol and dried at 70° C. 21 g terpolymer with a melting point of 238° C. and an LVN of 0.55 dl/g was obtained.

EXAMPLE 5

A carbon monoxide/ethylene/propylene terpolymer was prepared substantially in the same way as the terpolymer in Example 4, except for the following differences:
(a) instead of 5 ml liquid propylene, 20 ml of this compound was used, and
(b) instead of the polymerization being stopped after 7 hours, it was stopped after 4 hours.
21 g terpolymer with a melting point of 220° C. and an LVN of 0.4 dl/g was obtained.

EXAMPLE 6

A carbon monoxide/ethylene/propylene terpolymer was prepared substantially in the same way as the terpolymer in Example 4, except for the following differences:
(a) instead of 5 ml of liquid propylene, 50 ml of this compound was used,
(b) instead of a temperature of 85° C., a temperature of 60° C. was used,
(c) instead of a pressure of 55 bar, a pressure of 45 bar was used, and
(d) instead of the polymerization being stopped after 7 hours, it was stopped after 5 hours.
5 g terpolymer with a melting point of 214° C. and an LVN of 0.7 dl/g was obtained.

EXAMPLE 7

A carbon monoxide/ethylene/propylene terpolymer was prepared substantially in the same way as the terpolymer in Example 4, except for the following differences:
(a) instead of 5 ml of liquid propylene, 45 ml of this compound was used,
(b) instead of a temperature of 85° C., a temperature of 45° C. was used,
(c) instead of a pressure of 55 bar, a pressure of 45 bar was used,
(d) for pressurizing the autoclave, instead of a carbon monoxide/ethylene mixture with a mol. ratio of 1:1 being applied, a similar mixture with a mol. ratio of 3:1 was used, and
(e) instead of the polymerization being stopped after 7 hours, it was stopped after 5 hours.
1 g terpolymer with a melting point of 178° C. and an LVN of 1.4 dl/g was obtained.

EXAMPLE 8

A carbon monoxide/ethylene/butene-1 terpolymer was prepared substantially in the same way as the terpolymer in Example 4, except for the following differences:
(a) instead of 5 ml of propylene, 20 ml of liquid butylene-1 was used, and
(b) instead of the polymerization being stopped after 7 hours, it was stopped after 4 hours.

24 g terpolymer with a melting point of 244° C. and an LVN of 0.6 dl/g was obtained.

EXAMPLE 9

A carbon monoxide/ethylene/octylene-1 terpolymer was prepared substantially in the same way as the terpolymer in Example 4, except for the following differences:
(a) instead of 5 ml of propylene, 39 ml of octylene-1 was used, and
(b) twice the quantity of the catalyst solution was used, and
(c) instead of the polymerization being stopped after 7 hours, it was stopped after 19 hours.

19 g terpolymer with a melting point of 225° C. and an LVN of 0.28 dl/g was obtained.

Of the polymers according to Examples 1–9, only the terpolymers according to Examples 4–9 are polymers according to the invention. The copolymers prepared according to Examples 1–3 fall outside the scope of the invention and are included in the patent application for comparison.

With the aid of $^{13}$C-NMR analysis it was established that the carbon monoxide/ethylene copolymers prepared according to Examples 1–3 had a linear alternating structure and they they consisted of units with the formula $-CO-(C_2H_4)-$. As can be seen from the Example 1–3, the three copolymers all had different LVN values all had a melting point of 257° C., although they were prepared by different methods.

It was also established with the aid of $^{13}$C-NMR analysis that the carbon monoxide/ethylene/propylene terpolymers prepared according to Examples 4–7 had a linear structure and that they consisted of units with the formula $-CO-(C_2H_4)-$ and units with the formula $-CO-(C_3H_6)-$, which units were distributed in a random manner in the terpolymers. On the basis of the data from the $^{13}$C-NMR analysis, the value of the m/n quotient was determined for each of the terpolymers prepared according to Examples 4–7. These values are given in the table. As can be seen, the higher the value of the m/n quotient, the lower the melting point of the terpolymer.

Finally, it was also established by means of $^{13}$C-NMR analysis that the carbon monoxide/ethylene/butylene-1 and the carbon monoxide/ethylene/octylene-1 terpolymers prepared according to Examples 8 and 9 had a linear structure and that they consisted of units with the formula $-CO-(C_2H_4)-$ and units with the formula $-CO-(C_4H_8)-$ and $-CO-(C_8H_{16})-$ respectively, these units being distributed in the terpolymers in a random manner. From the $^{13}$C-NMR analysis data, the value of the m/n quotient was also determined for the terpolymers prepared according to Examples 8 and 9. These values are also given in the table.

TABLE

| | m/n | melting point °C. |
|---|---|---|
| CO/C$_2$/C$_3$ terpolymer according to Example 4 | 0.030 | 238 |
| CO/C$_2$/C$_3$ terpolymer according to Example 5 | 0.073 | 220 |
| CO/C$_2$/C$_3$ terpolymer according to Example 6 | 0.104 | 214 |
| CO/C$_2$/C$_3$ terpolymer according to Example 7 | 0.235 | 178 |
| CO/C$_2$/C$_4$ terpolymer according to Example 8 | 0.007 | 244 |
| CO/C$_2$/C$_8$ terpolymer according to Example 9 | 0.057 | 225 |

From the carbon monoxide/ethylene copolymer with melting point 257° C. prepared according to Example 3 a plate was pressed for 15 minutes at 285° C. This resulted in complete gelling (100%) of the copolymer and a very strong yellow discoloration.

From the carbon monoxide/ethylene/propylene terpolymer with melting point 214° C. prepared according to Example 6 a plate was also pressed for 15 minutes, but this time at 240° C. In this case there was no gelling (less than 0.5%) and hardly and discoloration.

The degree of gelling of the polymers is determined by taking up 100 mg polymer in 50 ml m-cresol at 100° C. and filtering the mixture over a 75μ filter. The degree of gelling is specified as the weight percentage of the polymer remaining on the filter.

What is claimed is:

1. A linear polymer consisting essentially of an average of n units with the formula $-CO-(C_2H_4)-$ and an average of m units with the general formula $-CO-(C_xH_y)-$ wherein the units are randomly distributed in the polymer, the quotient m/n is between about 0.33 and about 0.007, x is greater than 2 and less than 20, y is 2x, and the polymer has a melting point between about 150° C. and 245° C.

2. A linear polymer consisting of an average of n repeating units of the formula $-CO-(C_2H_4)-$ and an average of m repeating units of the formula $-CO-(C_3H_6)-$, wherein the units are randomly distributed in the polymer, said polymer having an m/n quotient between about 0.33 and about 0.023, and said polymer having a melting point between about 150° C. and 245° C.

3. The polymer of claim 1 having a melting point between about 170° C. and about 240° C.

4. The polymer of claim 1 having a melting point between about 195° C. and about 235° C.

5. The polymer of claim 1 having a Limiting Viscosity Number in m-cresol at 100° C. between about 0.2 and 5.0 dl/g.

6. The polymer of claim 1 having an Limiting Viscosity Number in m-cresol at 100° C. between about 0.3 and 4.5 dl/g.

7. The polymer of claim 1 having an Limiting Viscosity Number in m-cresol at 100° C. between about 0.4 and 4.0 dl/g.

8. The polymer of claim 1 having units with the general formula $-CO-(C_xH_y)-$, where x is greater than 2 and less than 10.

9. The polymer of claim 1 having units with the formula $-CO-(C_2H_4)-$ and units with the formula $-CO-(C_3H_6)-$.

10. The polymer of claim 1 having units with the formula $-CO-(C_2H_4)-$ and units with the formula $-CO-(C_4H_8)-$.

11. The polymer of claim 1 having units with the formula $-CO-(C_2H_4)-$ and units with the formula $-CO-(C_8H_{16})-$.

12. An article of manufacture comprising a linear polymer consisting essentially of an average of n units with the formula $-CO-(C_2H_4)-$ and an average of m units with the general formula $-CO-(C_xH_y)-$ wherein the units are randomly distributed in the polymer, the quotient m/n is between about 0.33 and about 0.007, x is greater than 2 and less than 20, y is 2x, and the polymer has a melting point between about 150° C. and 245° C.

13. An article of manufacture comprising a linear polymer consisting of an average of n repeating units of the formula $-CO-(C_2H_4)-$ and an average of m repeating units of the formula $-CO-(C_3H_6)-$, wherein the units are randomly distributed in the polymer, said polymer having an m/n quotient between 0.33 and about 0.023, and said polymer having a melting point between about 150° C. and 245° C.

14. The article of claim 12, wherein the polymer has a melting point between about 170° C. and 240° C.

* * * * *